(12) United States Patent
Kobayashi

(10) Patent No.: US 12,431,048 B2
(45) Date of Patent: Sep. 30, 2025

(54) DISPLAY CONTROL SYSTEM AND MOVING OBJECT

(71) Applicant: SEIKO EPSON CORPORATION, Tokyo (JP)

(72) Inventor: Daisuke Kobayashi, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/359,166

(22) Filed: Jul. 26, 2023

(65) Prior Publication Data

US 2024/0038110 A1 Feb. 1, 2024

(30) Foreign Application Priority Data

Jul. 27, 2022 (JP) ................................ 2022-119713

(51) Int. Cl.
*G09G 3/00* (2006.01)
*G06T 5/80* (2024.01)
*G09G 3/20* (2006.01)
*G09G 3/34* (2006.01)

(52) U.S. Cl.
CPC ............. *G09G 3/006* (2013.01); *G06T 5/80* (2024.01); *G09G 3/2096* (2013.01); *G09G 3/3406* (2013.01); *G09G 3/002* (2013.01); *G09G 2320/0233* (2013.01); *G09G 2320/0242* (2013.01); *G09G 2320/0626* (2013.01); *G09G 2330/12* (2013.01); *G09G 2380/10* (2013.01)

(58) Field of Classification Search
CPC .... G09G 3/006; G09G 3/2096; G09G 3/3406; G09G 3/002; G09G 2320/0233; G09G 2320/0242; G09G 2320/0626; G09G 2330/12; G09G 2380/10; G09G 3/3426; G06T 5/80
See application file for complete search history.

(56) References Cited

U.S. PATENT DOCUMENTS

| | | | | |
|---|---|---|---|---|
| 5,710,602 A | * | 1/1998 | Gardos | H04N 19/85 348/591 |
| 5,848,201 A | * | 12/1998 | Kajiwara | G09G 5/14 382/296 |
| 6,135,354 A | * | 10/2000 | Kubon | G06K 7/1478 235/462.11 |
| 9,168,869 B1 | * | 10/2015 | Kamal | B60R 1/30 |

(Continued)

FOREIGN PATENT DOCUMENTS

JP 2005-236528 A 9/2005
JP 2017-084000 A 5/2017

*Primary Examiner* — Jose R Soto Lopez
(74) *Attorney, Agent, or Firm* — Harness, Dickey & Pierce, P.L.C.

(57) ABSTRACT

A display control system includes: a processing device; and a circuit device configured to perform display control on a display device under control of the processing device. The processing device outputs an expected value of an error detection code of a specific still image in a predetermined frame of a video displayed on the display device, and the circuit device includes an error check circuit that receives image data of the video from the processing device, calculates an error detection code value of the specific still image in the predetermined frame, and checks an error by comparing the error detection code value with the expected value.

20 Claims, 12 Drawing Sheets

(56) References Cited

U.S. PATENT DOCUMENTS

| | | | |
|---|---|---|---|
| 2006/0017844 A1* | 1/2006 | Iwaki | H04N 21/440263 348/581 |
| 2007/0008325 A1* | 1/2007 | Rai | G06T 1/20 345/501 |
| 2007/0078922 A1* | 4/2007 | Sano | G09G 3/006 708/446 |
| 2007/0217002 A1* | 9/2007 | Fukue | G09G 5/393 359/443 |
| 2009/0080794 A1* | 3/2009 | Amano | G06T 5/92 382/274 |
| 2010/0149226 A1* | 6/2010 | Byun | G09G 3/3225 345/77 |
| 2010/0165117 A1* | 7/2010 | Kim | H04N 19/136 382/233 |
| 2010/0171760 A1* | 7/2010 | Itkin | G09G 5/377 345/634 |
| 2010/0222972 A1* | 9/2010 | Hustyi | F16H 59/02 345/173 |
| 2011/0175925 A1* | 7/2011 | Kane | G01J 1/4204 345/589 |
| 2012/0212467 A1* | 8/2012 | Kohtoku | G02F 1/1354 345/207 |
| 2013/0113781 A1* | 5/2013 | Park | G09G 3/2946 345/212 |
| 2013/0120129 A1* | 5/2013 | Tippelhofer | B60Q 3/283 340/456 |
| 2014/0333683 A1* | 11/2014 | Qi | G09G 3/3233 345/690 |
| 2015/0109533 A1* | 4/2015 | Ikeda | H04N 9/646 348/566 |
| 2015/0194083 A1* | 7/2015 | Sinha | G09G 5/395 345/212 |
| 2015/0381990 A1* | 12/2015 | Kwa | G06F 3/14 375/240.02 |
| 2016/0001693 A1* | 1/2016 | Tamura | G09G 5/12 340/441 |
| 2016/0036885 A1* | 2/2016 | Takashima | G09C 5/00 709/246 |
| 2016/0117978 A1* | 4/2016 | Shikata | G09G 3/2096 345/690 |
| 2016/0182952 A1* | 6/2016 | Wu | H04N 21/4627 725/31 |
| 2016/0358527 A1* | 12/2016 | Bae | H04N 19/593 |
| 2017/0094268 A1* | 3/2017 | Gulati | G09G 5/39 |
| 2017/0113612 A1* | 4/2017 | Taguchi | G09G 5/00 |
| 2017/0213526 A1* | 7/2017 | Hara | G09G 3/2096 |
| 2017/0262339 A1* | 9/2017 | Hoshina | G06F 11/0739 |
| 2017/0295343 A1* | 10/2017 | Konishi | G09G 3/2096 |
| 2018/0114507 A1* | 4/2018 | Mitsugi | G06F 9/451 |
| 2018/0134217 A1* | 5/2018 | Peterson | G08G 1/167 |
| 2018/0144499 A1* | 5/2018 | Watanabe | G06T 7/74 |
| 2018/0203226 A1* | 7/2018 | Tomioka | G06F 11/0739 |
| 2018/0247613 A1* | 8/2018 | Lee | G09G 5/026 |
| 2019/0013826 A1* | 1/2019 | Kikuta | H04N 7/183 |
| 2019/0043455 A1* | 2/2019 | Davidson | G09G 3/006 |
| 2019/0108658 A1* | 4/2019 | Falkås | G06F 3/04845 |
| 2019/0266711 A1* | 8/2019 | Anand | G06T 7/0002 |
| 2019/0286115 A1* | 9/2019 | Wang | G06F 9/3877 |
| 2019/0311693 A1* | 10/2019 | Saka | G06F 3/147 |
| 2020/0019457 A1* | 1/2020 | Takano | B60K 35/23 |
| 2020/0126517 A1* | 4/2020 | Jia | H04N 21/47205 |
| 2020/0198468 A1* | 6/2020 | Anand | B60K 35/90 |
| 2020/0342796 A1* | 10/2020 | Kobayashi | G09G 3/2096 |
| 2020/0379941 A1* | 12/2020 | Okajima | H04L 12/40189 |
| 2021/0193066 A1* | 6/2021 | Anand | G09G 3/3648 |
| 2021/0201746 A1* | 7/2021 | Seo | G09G 3/2059 |
| 2022/0036781 A1* | 2/2022 | Yoda | G09G 3/006 |
| 2022/0094818 A1* | 3/2022 | Moriya | G06T 1/20 |
| 2022/0100451 A1* | 3/2022 | Ino | B60K 35/29 |
| 2022/0114928 A1* | 4/2022 | Atkins | G09G 3/20 |
| 2022/0144298 A1* | 5/2022 | Lerzer | G06V 20/56 |
| 2022/0292003 A1* | 9/2022 | Yu | G09G 3/006 |
| 2023/0120604 A1* | 4/2023 | Donohoe | H04N 23/633 348/187 |
| 2023/0136022 A1* | 5/2023 | Li | G09G 3/003 345/419 |
| 2023/0282156 A1* | 9/2023 | Wong | G09G 3/32 345/690 |
| 2023/0386420 A1* | 11/2023 | Wong | G09G 3/342 |

\* cited by examiner

SPECIFIC STILL IMAGE

| OPERATION ENVIRONMENT (BRIGHTNESS ENVIRONMENT AND OPERATION MODE ENVIRONMENT) | EXPECTED VALUE OF CRC |
|---|---|
| OPE1 | EV1 |
| OPE2 | EV2 |
| ⋮ | ⋮ |
| OPEi | EVi |
| ⋮ | ⋮ |
| OPEn | EVn |

DISPLAY CONTROL SYSTEM AND MOVING OBJECT

The present application is based on, and claims priority from JP Application Serial Number 2022-119713, filed Jul. 27, 2022, the disclosure of which is hereby incorporated by reference herein in its entirety.

BACKGROUND

1. Technical Field

The present disclosure relates to a display control system, a moving object, and the like.

2. Related Art

In a display control system for controlling a display device, it is desirable to check whether each circuit block in the display control system is appropriately operating. For example, JP-A-2005-236528 discloses a projector that performs color correction by imaging a logo at the start of projection.

In JP-A-2005-236528, the color correction is performed using a logo image, and an error check as to whether each circuit block in the display control system appropriately operates is not performed. If the error check for each circuit block in the display control system is dynamically executed, a circuit scale may be increased, and processing may be complicated.

SUMMARY

One aspect of the present disclosure relates to a display control system including: a processing device; and a circuit device configured to perform display control on a display device under control of the processing device. The processing device outputs an expected value of an error detection code of a specific still image in a predetermined frame of a video displayed on the display device, and the circuit device includes an error check circuit that receives image data of the video from the processing device, calculates an error detection code value of the specific still image in the predetermined frame, and checks an error by comparing the error detection code value with the expected value.

Another aspect of the present disclosure relates to a moving object including: the display control system described above; and the display device.

DESCRIPTION OF EMBODIMENTS

Hereinafter, a preferred embodiment according to the present disclosure will be described in detail. The embodiment to be described below does not unduly limit contents described in the claims, and not all configurations described in the embodiment are necessarily essential constituent elements.

1. Display Control System and Circuit Device

Figure 1:
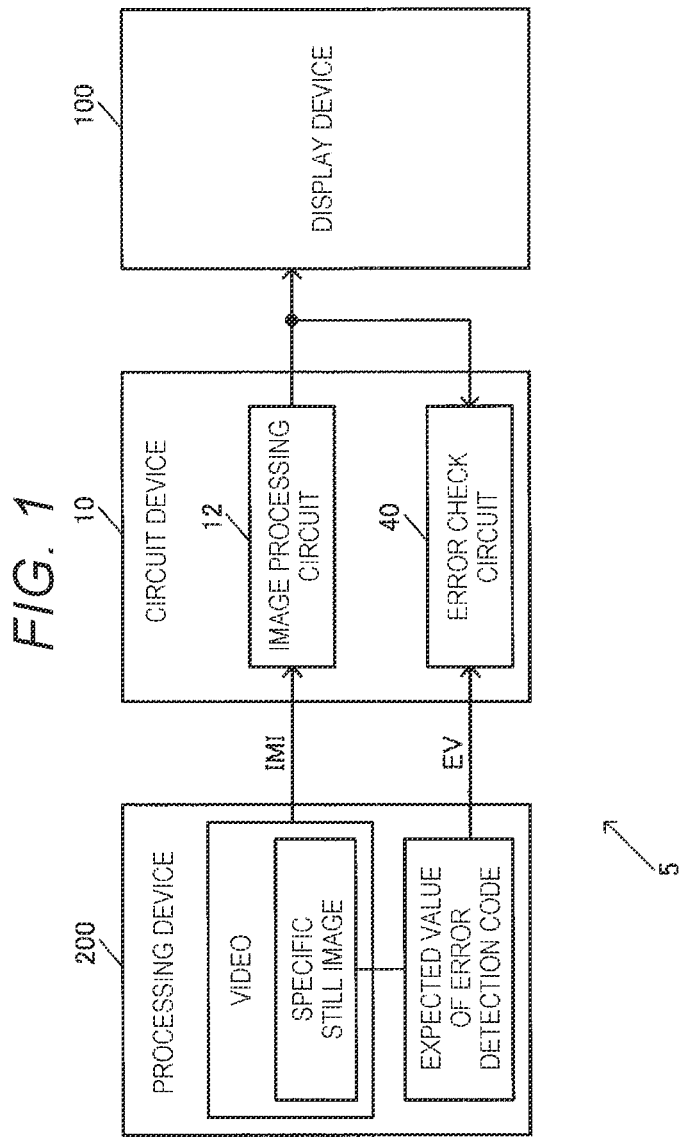
FIG. 1 is a configuration example of a display control system and a circuit device according to an embodiment.

FIG. 1 shows a configuration example of a display control system 5 and a circuit device 10 according to an embodiment. The display control system 5 includes a processing device 200 and the circuit device 10. The circuit device 10 includes an image processing circuit 12 and an error check circuit 40. The display control system 5 is a system that performs display control on a display device 100.

The display device 100 displays an image based on image data. When a head-up display is taken as an example, the display device 100 is a device for displaying a virtual image in a field of view of a user. In addition, the display device 100 is, for example, a display device used for the head-up display, and may be another display device for an automobile, such as a cluster display which is a meter panel display, or may be a display device for an application other than the automobile. In the following description, the head-up display is appropriately referred to as a HUD.

The processing device 200 is, for example, a system on chip (SoC) and is also called, for example, a master device. The processing device 200 can be implemented by, for example, a microcomputer, a CPU, or a MPU. For example, the circuit device 10 is communicably connected to the processing device 200 through an interface circuit (not shown). Further, image data IMI from the processing device 200 is input to the circuit device 10 through the interface circuit.

The circuit device 10 is, for example, an integrated circuit device in which a plurality of circuit elements are integrated on a semiconductor substrate. The circuit device 10 performs the display control on the display device 100 under control of the processing device 200. For example, the circuit device 10 performs control for displaying an image on the display device 100 based on the image data IMI and various kinds of control information from the processing device 200. The display device 100 displays the image based on display image data from the circuit device 10. When the display device 100 is the HUD, the circuit device 10 is a HUD controller.

Further, in the embodiment, the processing device 200 outputs an expected value EV of an error detection code of a specific still image in a predetermined frame of a video displayed on the display device 100. For example, the processing device 200 outputs, to the circuit device 10, the image data IMI of the video, which is a display video on the display device 100. Then, the image processing circuit 12 of the circuit device 10 performs various kinds of image processing to output, for example, image data after the image processing to the display device 100, and an image corresponding to the image data is displayed. The image processing is, for example, color correction, gamma correction, and white balance adjustment.

The video includes the specific still image. The specific still image is, for example, a known image such as a logo image, an emblem image, or an opening image. For example, the specific still image is displayed on the display device 100 in the predetermined frame during playback of the video. For example, the specific still image is displayed in a k-th frame among first to m-th frames of the video. The frame in which the specific still image is displayed may be a plurality of frames. Since the specific still image is a known image, the expected value EV of the error detection code of the specific still image is also known. The error detection code is, for example, a cyclic redundancy check (CRC), a checksum, and an error-correcting code (ECC). The CRC is an error detection code called a cyclic redundancy check. In the CRC, a remainder obtained by dividing data on a transmission side by a specific generation polynomial is added as inspection data and transmitted, the data is divided using the same generation polynomial on a reception side, and the remainder is compared and checked to detect an error in reception data. In the checksum, for example, a data string is regarded as a string of integer values, a sum is calculated, and a remainder obtained by dividing the result by a constant is used as inspection data. The ECC is an error-correcting code capable of detecting and correcting an error in transmitted data, and a check operation thereof is the same as that of a parity check. The CRC and the ECC have the same check operation, whereas the CRC is added with a result calculated based on the transmitted data, and an error is detected but cannot be corrected. The error detection code is not limited to the CRC, the checksum, and the ECC, and various error detection code systems can be employed.

Since the processing device 200 that outputs the video as a video source grasps the frame in which the specific still image is displayed in the video and a content of the specific still image, the expected value EV of the error detection code such as the CRC of the specific still image can be stored in a storage unit (not shown). Then, the processing device 200 outputs, to the circuit device 10, the image data IMI of the video and the expected value EV of the error detection code of the specific still image in the video. The processing device 200 also outputs, to the circuit device 10, designation information on the frame in which the specific still image is displayed in the video.

The circuit device 10 includes the error check circuit 40. The error check circuit 40 receives the image data IMI of the video from the processing device 200, and calculates an error detection code value such as a CRC value of the specific still image in the predetermined frame. For example, the error check circuit 40 calculates the error detection code value of the image data after the image processing executed by the image processing circuit 12. Alternatively, the error check circuit 40 calculates an error detection code value of light source control information on a backlight when an image is displayed on the display device 100 due to the image data. For example, the error check circuit 40 calculates a value of the error detection code such as the CRC, the checksum, or the ECC performed on a processing device 200 side. Specifically, the error check circuit 40 identifies a frame designated by frame designation information from the processing device 200 as a frame in which the specific still image is displayed, and calculates the error detection code value based on the image data of the frame. Then, the error check circuit 40 compares the calculated error detection code value with the expected value EV from the processing device 200, and checks an error in the specific still image. For example, when the error detection code value does not coincide with the expected value EV, the error check circuit 40 determines that the error is detected. When the error is detected, for example, an error interrupt signal is output to the processing device 200 or the like. Information on an interrupt factor is written to a register (not shown). Accordingly, the processing device 200 can recognize that there is a defect in a circuit block or processing of the circuit device 10.

As described above, in the embodiment, the processing device 200 outputs the expected value of the error detection code of the specific still image in the predetermined frame of the video displayed on the display device 100. Then, the circuit device 10 receives the image data of the video from the processing device 200, calculates the error detection code value of the specific still image in the predetermined frame, compares the error detection code value with the expected value, and checks the error. In this way, by effectively using the specific still image included in the video, and outputting, by the processing device 200, the expected value of the error detection code of the specific still image to the circuit device 10, the circuit device 10 can compare the error detection code value of the specific still image with the expected value. Accordingly, it is possible to check whether there is a defect in the circuit block or the processing of the circuit device 10 with simple and low-load processing of determining whether the error detection code value of the specific still image coincides with the expected value.

Figure 2:
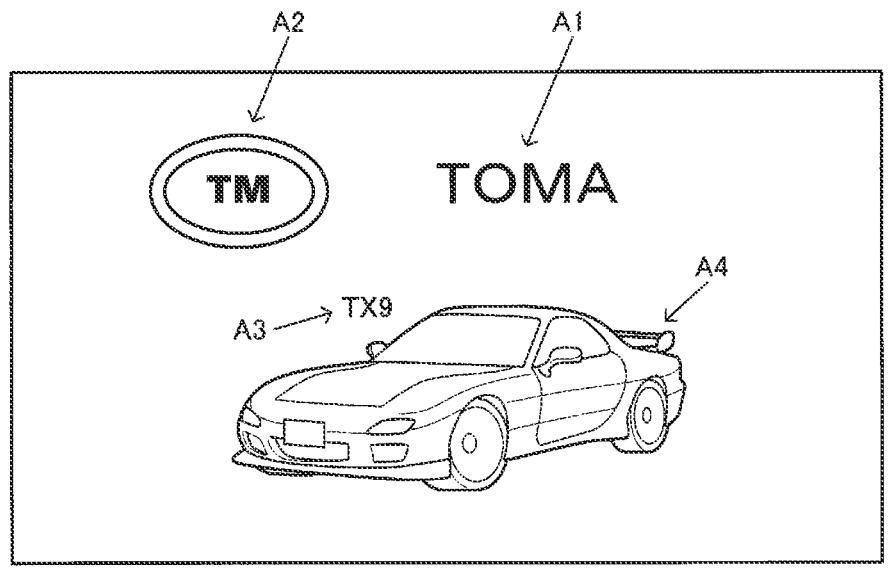
FIG. 2 is an example of a specific still image.

FIG. 2 shows an example of the specific still image. The specific still image in FIG. 2 is, for example, an image to be displayed at start-up of a moving object such as an automobile. For example, in the automobile or the like, when a drive mechanism such as an engine or a motor is started up, a video display of a logo, an emblem or the like of a manufacturer or a vehicle is performed. In the video, as indicated by A1 and A2, the specific still image including a specific character, a specific mark, or a specific symbol representing a name or a logo of an automobile manufacturer is displayed. Alternatively, as indicated by A3 and A4, a specific character representing an automobile name, an image representing the automobile, and the like are also displayed. The specific still image shown in FIG. 2 is displayed in a specific frame at the start-up of the automobile, and the processing device 200 can store the expected value of the error detection code of the specific still image. For example, when the frame in which the image in FIG. 2 is displayed is known, by calculating the error detection code of the image data at that time, the circuit device 10 can detect an error by comparing the calculated error detection code value with the expected value from the processing device 200.

As described above, the specific still image is an image in the predetermined frame of the video to be displayed at the start-up of the moving object provided with the display control system 5. As will be described later, the moving object is an automobile, a motorcycle, a ship, or the like. The start-up of the moving object is, for example, the start-up of the engine, the motor, or the like, which is the drive mechanism of the moving object such as the automobile, the motorcycle, or the ship. In this way, it is possible to detect an error in each circuit block or processing of the display control system 5 provided in the moving object with simple and low-load processing of effectively utilizing the specific still image to be displayed at the start-up of the moving object and comparing the error detection code value of the specific still image with the expected value.

As shown in FIG. 2, the specific still image is, for example, an image including the specific character, the specific symbol, or the specific mark. The specific character, the specific symbol, and the specific mark are, for example, characters, symbols, and marks related to the moving object or electronic equipment in which the display control system 5 is incorporated. For example, the specific character, the specific symbol, and the specific mark are a name of a manufacturer or a product or the like of the moving object or the electronic equipment, a symbol or a mark representing the manufacturer, the product, or the like of the moving object or the electronic equipment. The mark is a symbol, a sign, a mark, a badge, a pattern, or the like, and it can be said that the specific symbol is also one of the specific marks. In this way, it is possible to detect an error in each circuit block or processing of the display control system 5 by effectively utilizing the specific still image including the specific character, the specific symbol, or the specific mark, and comparing the error detection code value with the expected value.

For example, when the engine or the like of the automobile is started up, a manufacturer logo or an emblem of each company, a vehicle type name, or the like is output to an in-vehicle head-up display (HUD), a center information display (CID), a cluster display such as a meter, or the like. Using the fixed specific image at the start-up, a check for the CRC or the like of the image data and the light source control information corresponding to the light source control signal of the backlight is performed. In this way, it is possible to automatically, simply, and reliably perform an output error check for the circuit device 10. At the timing of the start-up, it is possible to perform the check for the CRC or the like for not only a signal of the image data but also a control signal of a light source such as a LED. As will be described later, when checking the light source control information of the backlight, it is possible to check without displaying anything on the display device 100 by turning off the image display. For example, until now, when performing the check for the CRC or the like, it is necessary to dynamically check an error in each circuit block module each time.

For example, if there is an inverse conversion function for the color correction and distortion correction to be described later, it is possible to perform the output error check in real time. However, in a circuit configuration that does not require the inverse conversion function, adding the inverse conversion function only for the output error check is unreasonable and an increase in a circuit scale is unavoidable. In addition, it may be difficult to compare CRC results after performing the image processing for image enhancement such as the gamma correction and FRC. In this regard, according to the embodiment, there is an advantage in that a frame is designated at a fixed timing by using a fixed animation video at the start-up specific to an in-vehicle display or the like, and all paths from input to output of a line of the image data and a line of the light source control signal can be simultaneously checked for the CRC or the like. For example, since a logo video or the like is a video, a frame to be checked is designated from the processing device 200, which is the SoC, to the circuit device 10 in order to cut out a frame at a certain timing and capture a still image. As will be described later, it is also possible to provide a variation by providing a table of an operation environment corresponding to external light or a display position.

2. Detailed Configuration Example

Figure 3:
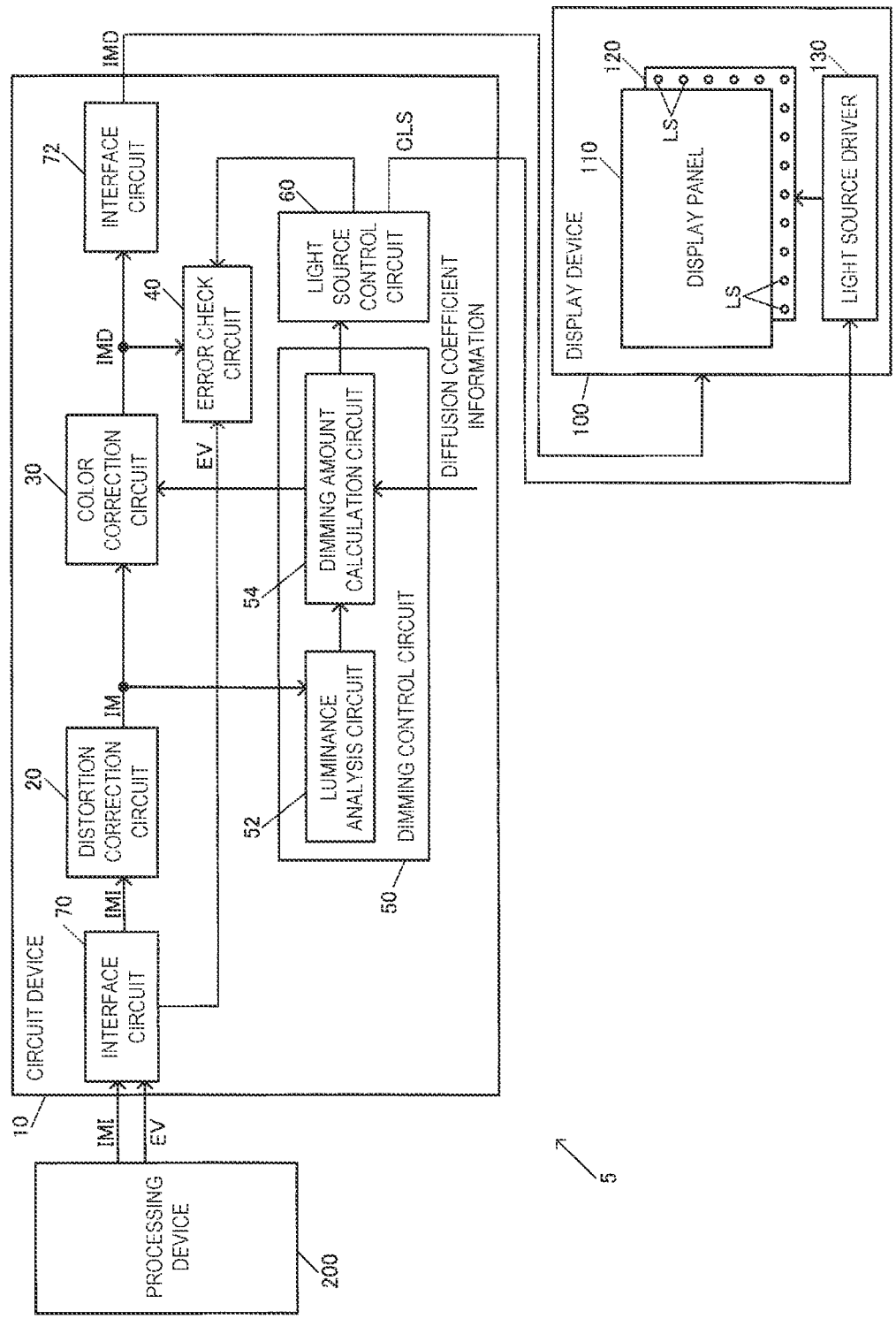
FIG. 3 is a detailed configuration example of the display control system and the circuit device according to the embodiment.

FIG. 3 shows a detailed configuration example of the display control system 5 and the circuit device 10 according to the embodiment. In FIG. 3, the circuit device 10 includes a distortion correction circuit 20, a color correction circuit 30, the error check circuit 40, a dimming control circuit 50, a light source control circuit 60, and interface circuits 70 and 72. For example, the distortion correction circuit 20 and the color correction circuit 30 correspond to the image processing circuit 12 in FIG. 1. The circuit device 10, the processing device 200, and the display device 100 are not limited to the configuration example in FIG. 3 or the configuration of another configuration example to be described later, and various modifications such as omitting a part of the components, adding other components, and replacing a part of the components with other components can be made. In the following description, a case in which the error detection code is the CRC, the error detection code value is the CRC value, and the expected value of the error detection code is the expected value of the CRC will be mainly described as an example. However, the error detection code is not limited to the CRC, and may be the checksum, the ECC, or the like as described above.

The display device 100 includes a display panel 110, a backlight 120, and a light source driver 130. The display panel 110 is, for example, an electro-optical panel. The light source driver 130 is a circuit that drives a light source of the backlight 120. For example, the backlight 120 is provided with a plurality of light sources LS. Specifically, the plurality of light sources LS each being implemented by the LED or the like are arranged in arrays in the backlight 120. The light source driver 130 drives the plurality of light sources LS to emit light. The display device 100 may include a display controller (not shown) and a display driver (not shown) that drives the display panel 110. The display driver may include a data driver that drives data lines of the display panel 110, a scanning driver that drives scanning lines of the display panel 110, and the like.

Figure 4:
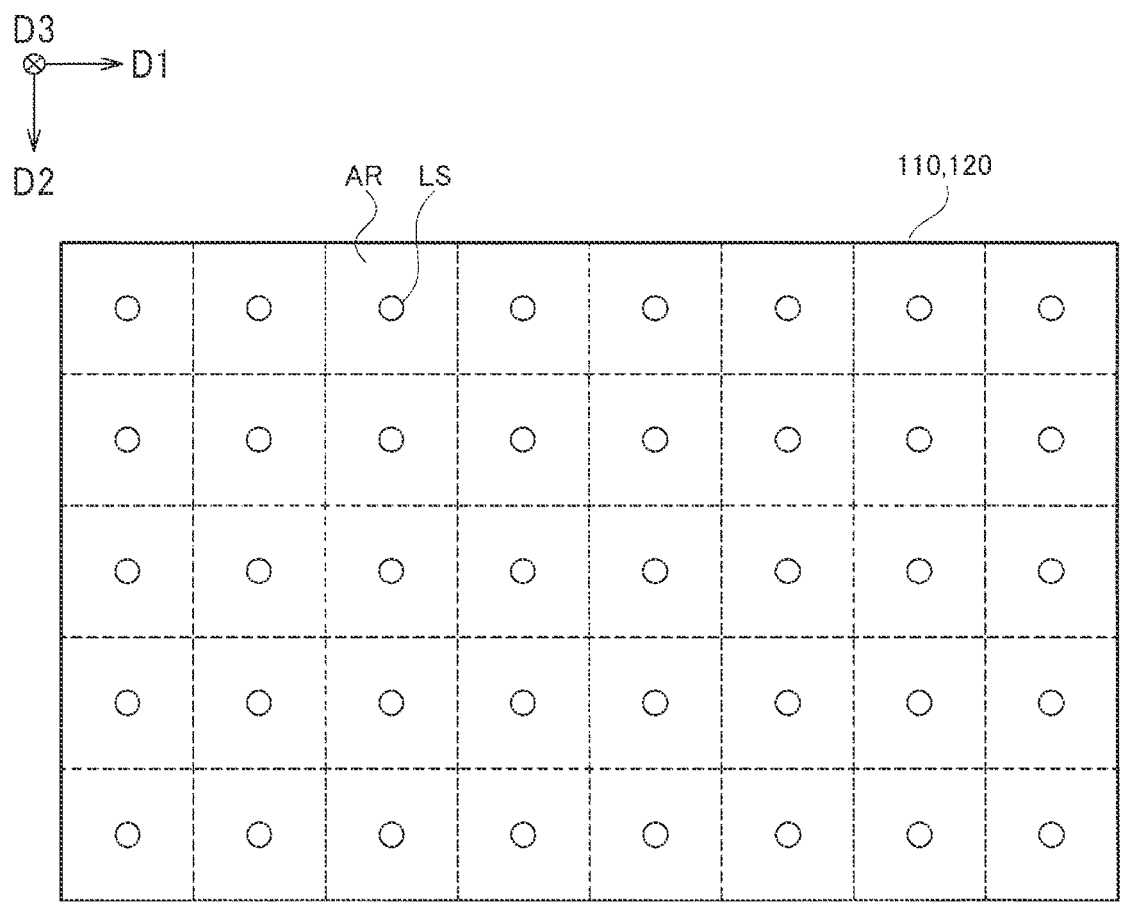
FIG. 4 is a configuration example of a backlight and a display panel.

FIG. 4 is a configuration example of the backlight 120 and the display panel 110. In FIG. 4, a direction D1 is a horizontal scanning direction of the display panel 110, and a direction D2 is a vertical scanning direction of the display panel 110. A direction D3 is a direction orthogonal to the directions D1 and D2, and is a direction in which the display panel 110 is viewed in a plan view. The backlight 120 is provided on a direction D3 side of the display panel 110, and emits illumination light in a direction opposite to the direction D3, which is a direction toward the display panel 110.

The backlight 120 includes the plurality of light sources LS. FIG. 4 shows an example in which 8×5 light sources LS are arranged in a two-dimensional array. That is, eight light sources LS are arranged along the direction D1, and five light sources LS are arranged along the direction D2. For appropriate local dimming, it is desirable to provide, for example, 100 or more light sources LS in the backlight 120. The light source LS is, for example, a light emitting diode (LED). The light source LS is not limited to the LED, and may be a light source whose light amount is independently controlled and which is close to a point light source. The light source close to the point light source is a light source in which a size of a light emitting portion of the light source LS is sufficiently smaller than an area AR corresponding to the light source LS. As the arrangement of the light sources LS, various arrangement forms such as a square arrangement and a hexagonal arrangement may be considered.

The display panel 110 has a pixel array, and an area in which a display image is displayed in the pixel array is set as a display area. The display area is divided into a plurality of areas AR. The light sources LS are disposed in the areas AR such that the light sources LS correspond to the areas AR, respectively. That is, one light source LS corresponds to one area AR. For example, when the display panel 110 is viewed in a plan view, the light source LS is disposed at a center of the area AR. However, an arrangement position of the light source LS is not limited thereto. In FIG. 4, the display area is divided into 8×5 areas AR corresponding to the 8×5 light sources LS. The areas AR are used for processing in the circuit device 10. In the display image actually displayed on display panel 110, boundaries of the areas AR do not exist. The display panel 110 is a panel in which a transmittance of pixels is controlled according to the display image, and the illumination light of the backlight 120 transmits through the pixels to display the display image. The display panel 110 is, for example, a liquid crystal display panel.

Figure 5:
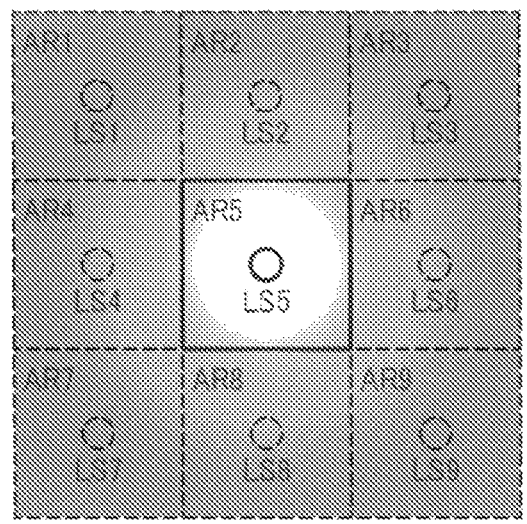
FIG. 5 is a diagram illustrating light sources and display areas.

As described above, when the display area of the display panel 110 is divided into the plurality of areas such that the light sources LS are disposed in the respective areas AR, the light sources LS illuminating the display panel 110 each have a light intensity distribution in which a light intensity decreases as a distance from the light sources LS increases. Therefore, the light intensity in a peripheral portion is smaller than that in the center of the area AR. The light intensity distribution of the light source LS is referred to as PSF. FIG. 5 shows an example of the light intensity distribution of the PSF. In FIG. 5, the light intensity distribution is indicated by gradation, and as the light intensity is indicated whiter, a coefficient of the light intensity distribution is larger. In FIG. 5, a size of the PSF corresponds to 3×3 areas AR1 to AR9, and a center of the PSF is disposed at the position of the light source.

As shown in FIG. 3, the circuit device 10 includes the distortion correction circuit 20 and the color correction circuit 30. The distortion correction circuit 20 performs the distortion correction on the image data IMI which is input image data from the processing device 200, and outputs image data IM after the distortion correction. Then, the color correction circuit 30 performs the color correction on the image data IM from the distortion correction circuit 20.

Specifically, the distortion correction circuit performs the distortion correction on the input image data IMI by using coordinate conversion between pixel coordinates in the input image data IMI and pixel coordinates in the image data IM, and outputs a result thereof as the image data IM. The distortion correction is image correction for performing a HUD display with no or reduced distortion by applying, to an image, image distortion inverse to image distortion when the image displayed on the display panel 110 is projected. The image distortion caused by projection includes image distortion caused by a curved surface of a screen of the HUD, image distortion caused by a HUD optical system, and both of the two kinds of image distortion. For example, the HUD presents an image to the user by projecting the image on a transparent screen or displaying the image on a transparent display panel. At this time, by deforming the image according to curvature or the like of the transparent screen or the transparent display panel, the user can see the image without distortion. The distortion correction circuit 20 performs such image deformation processing as the distortion correction.

For example, the distortion correction circuit performs processing of reverse mapping or forward mapping. The reverse mapping is also called a reverse warp, and is mapping processing in which the pixel coordinates in the image data IM, which is output image data, are coordinate-converted into reference coordinates corresponding to the pixel coordinates, and pixel data of the image data IM is obtained from pixel data of the image data IMI at the reference coordinates. The forward mapping is also called a forward warp, and is mapping processing in which the pixel coordinates in the image data IMI are coordinate-converted into movement destination coordinates corresponding to the pixel coordinates, and pixel data of the image data IM at the movement destination coordinates is obtained from pixel data of the image data IMI at the pixel coordinates. The coordinate conversion in the reverse mapping and the forward mapping is defined by a mapping parameter also called map data. The mapping parameter is a table in which coordinates on an input image are associated with coordinates on an output image, a table indicating a movement amount between the coordinates on the input image and the coordinates on the output image, a coefficient of a polynomial in which the coordinates on the input image are associated with the coordinates on the output image, or the like.

The color correction circuit 30 performs the color correction on the image data IM and outputs display image data IMD to the display device 100. That is, the color correction circuit 30 performs the color correction on the image data IM and outputs the image data IM after the color correction to the display device 100 as the display image data IMD. The color correction is, for example, color adjustment processing of the image data IM, and is correction processing of adjusting a color level. The color correction may also be referred to as luminance correction or gradation correction of the image data IM.

For example, when dimming control is performed while the display image data IMD is being displayed on the display device 100, the color correction circuit 30 performs the color correction on the image data IM according to a dimming amount under the dimming control. The dimming control is control for adjusting a light amount of a light source device which is the backlight 120. The dimming control is dimming control such as local dimming under which brightness of the backlight 120 is controlled for each area of the plurality of areas, and dimming control under which brightness of an entire display screen is globally controlled. Under the dimming control, in order to reduce power consumption of the light source device and to make black pixels appear blacker, control is performed to decrease a light amount of the light source of the light source device. In this case, the color correction circuit 30 performs the color correction to increase luminance of pixels corresponding to the light source on the display screen of the display device 100 by an amount corresponding to the decrease in the light amount of the light source. For example, the color correction circuit 30 performs the color correction on each pixel value of the image data IM, so that the image displayed on the display device 100 based on the display image data IMD has brightness and hue the same as an image of the image data IM, and outputs the image data after the color correction to the display device 100 as the display image data IMD. The color correction performed by the color correction circuit 30 is not limited to such color correction for compensating for the dimming control, and may be color correction for adjusting the hue of the display image on the display device 100.

The dimming control circuit 50 performs the dimming control on the light source based on the image data IM. Specifically, the dimming control circuit 50 performs the dimming control on the backlight 120 provided with the plurality of light sources, and implements the dimming control called, for example, the local dimming. For example, the dimming control circuit 50 performs calculation processing for obtaining information on the dimming amount based on the image data IM. Here, the information on the dimming amount is information for identifying the luminance at which the light source emits light under the dimming control.

The light source control circuit 60 performs, based on the information on the dimming amount from the dimming control circuit 50, control processing and designation processing on the light source driver 130 of the display device 100. The light source driver 130, which is a LED driver, drives the light sources LS of the backlight 120 based on the information on the dimming amount, thereby implementing the dimming control on the backlight 120. For example, the local dimming is implemented in which the dimming control is performed for each area of the plurality of areas obtained by dividing the display area of the display panel 110.

For example, the dimming control circuit 50 includes a luminance analysis circuit 52 and a dimming amount calculation circuit 54. The luminance analysis circuit 52 performs luminance analysis on the image data IM. Then, the dimming amount calculation circuit 54 calculates the dimming amount of each light source based on a result of the luminance analysis. Specifically, based on the image data IM, the luminance analysis circuit 52 searches each area of the plurality of areas of the display area for a pixel whose luminance is a maximum luminance in the corresponding area. Then, a luminance distribution for each light source is determined such that a color of the found maximum luminance can be displayed. Then, the dimming amount calculation circuit 54 performs calculation processing of recalculating the luminance for each pixel based on the determined luminance distribution of the light source and diffusion coefficient information of the light source to calculate the dimming amount corresponding to a luminance value of the backlight 120 for each pixel. The diffusion coefficient information is, for example, information on a diffusion coefficient parameter of a diffusion plate 115 in FIG. 13 to be described later. In addition, the information on the dimming amount from the dimming amount calculation circuit 54 is sent to the light source driver 130 through the light source control circuit and the light source driver 130 drives the light source of each area of the plurality of areas to emit light according to the dimming amount, thereby implementing the local dimming.

The interface circuit 70 is a circuit that performs interface processing with the processing device 200, and is, for example, a host interface circuit. For example, the image data IMI and the expected value EV of the CRC from the processing device 200 is received from the processing device 200 through the interface circuit 70. The received expected value EV of the CRC or the like is stored in a register (not shown). The interface circuit 72 is a circuit that performs interface processing with the display device 100. For example, the display image data IMD is output to the display device 100 through the interface circuit 72. Specifically, the display image data IMD is output to the display driver (not shown) of the display device 100.

A processing device such as a MCU may be provided between the light source control circuit 60 and the light source driver 130 to absorb a difference in communication protocol depending on a model of the light source driver 130. In this case, the light source driver 130 is controlled by the light source control circuit 60 through the processing device such as the MCU. The interface circuits 70 and 72 may be implemented by one interface circuit. The distortion correction circuit 20, the color correction circuit 30, the error check circuit 40, the dimming control circuit 50, the light source control circuit 60, and the interface circuits 70 and 72 are logic circuits. These logic circuits may be implemented as separate circuits, or may be implemented as an integrated circuit by automatic placement and wiring, or the like. Alternatively, a part or all of these logic circuits may be implemented by a processor such as a DSP. In this case, a program or a command set in which a function of each circuit is described is stored in a memory, and the function of each circuit is implemented by a processor executing the program or the command set.

Figure 6:
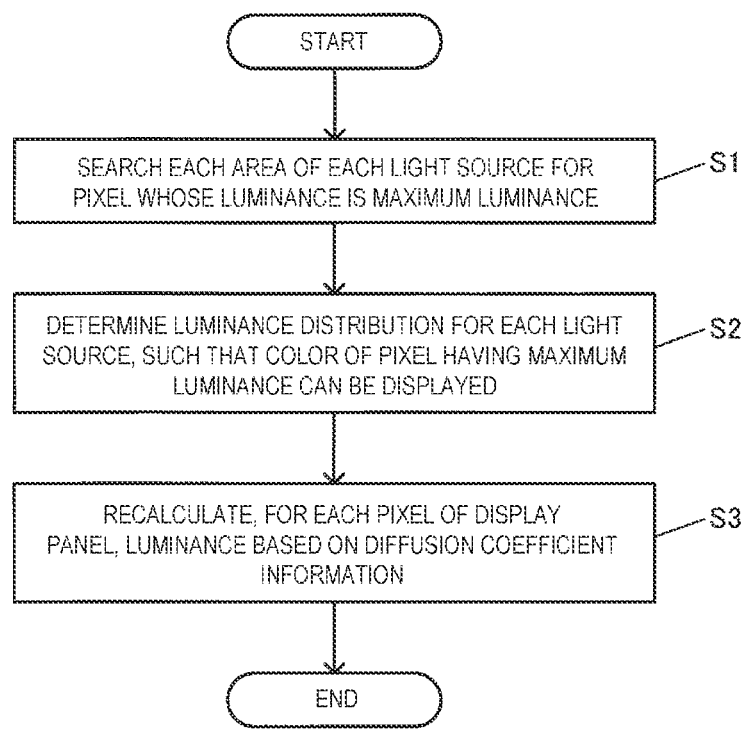
FIG. 6 is a flowchart showing a processing example of dimming control.

Next, a specific example of the dimming control according to the embodiment will be described. FIG. 6 is a flowchart showing a processing example of luminance calculation for each pixel. First, each area of each light source is searched for a pixel whose luminance is the maximum luminance (step S1). For example, in each area corresponding to each light source described with reference to FIGS. 4 and 5, based on the image data IM, luminance of pixels existing in the area is searched for, and the pixel whose luminance is the maximum luminance in the area is found. Then, a luminance distribution for each light source is determined such that a color of the pixel having the maximum luminance can be displayed (step S2). For example, it is assumed that a luminance range is from 0 to 100 and the luminance of the pixel having the maximum luminance is 50 in a target area. In this case, the luminance distribution of the light source is determined such that the pixel having the luminance of 50, which is the maximum luminance, can be displayed, for example, in a color having a luminance of 100, which is an upper limit of the luminance range. When the luminance of the pixel having the maximum luminance is the upper limit luminance of the luminance range, luminance of other pixels is guaranteed to fall within the luminance range of 0 to 100. Then, the luminance is recalculated based on the diffusion coefficient information for each pixel of the display panel 110 (step S3). Accordingly, a luminance value of the backlight 120 for each pixel is obtained.

Figure 13:
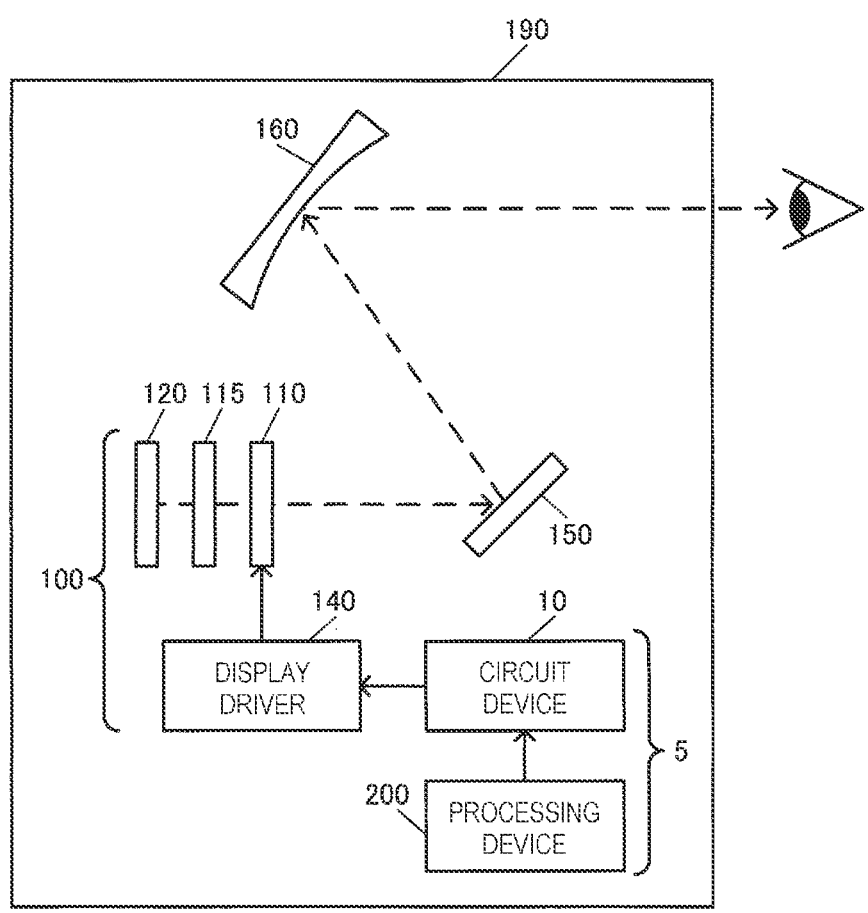
FIG. 13 is a configuration example of a head-up display which is an example of a display system according to the embodiment.

For example, as shown in FIG. 13 to be described later, in the display device 100, the diffusion plate 115 for diffusing light from the light source to obtain a uniform luminance distribution is provided, for example, between the backlight 120 and the display panel 110. The diffusion plate 115 is also called a diffusion sheet. For example, as shown in FIG. 5, the light intensity distribution PSF of the light source is the intensity distribution in which the light intensity decreases as the distance from the light source increases. By providing the diffusion plate 115 and diffusing the light from the light source, luminance unevenness can be reduced, and a uniform surface light source can be implemented. Here, examples of a light diffusion type include a direct type, a side light type, and an edge light type. Then, in step S3 of FIG. 6, in addition to the light intensity distribution PSF of the light source in FIG. 5, the diffusion of the light from the light source using the diffusion plate 115 is also reflected, and the luminance for each pixel of the display panel 110 is recalculated to obtain the luminance value of the backlight 120 for each pixel. As an example, for a target pixel, light intensities of, for example, 4×4 LED light sources around the target pixel are obtained based on the light intensity distribution PSF in FIG. 5 and the diffusion coefficient information on the diffusion plate 115 to recalculate the luminance and obtain the luminance value of the backlight 120 for each pixel. In this manner, in the display device 100 including the backlight 120 provided with the plurality of light sources and the diffusion plate 115, it is possible to appropriately obtain the luminance value of the backlight 120 for each pixel.

Figure 7:
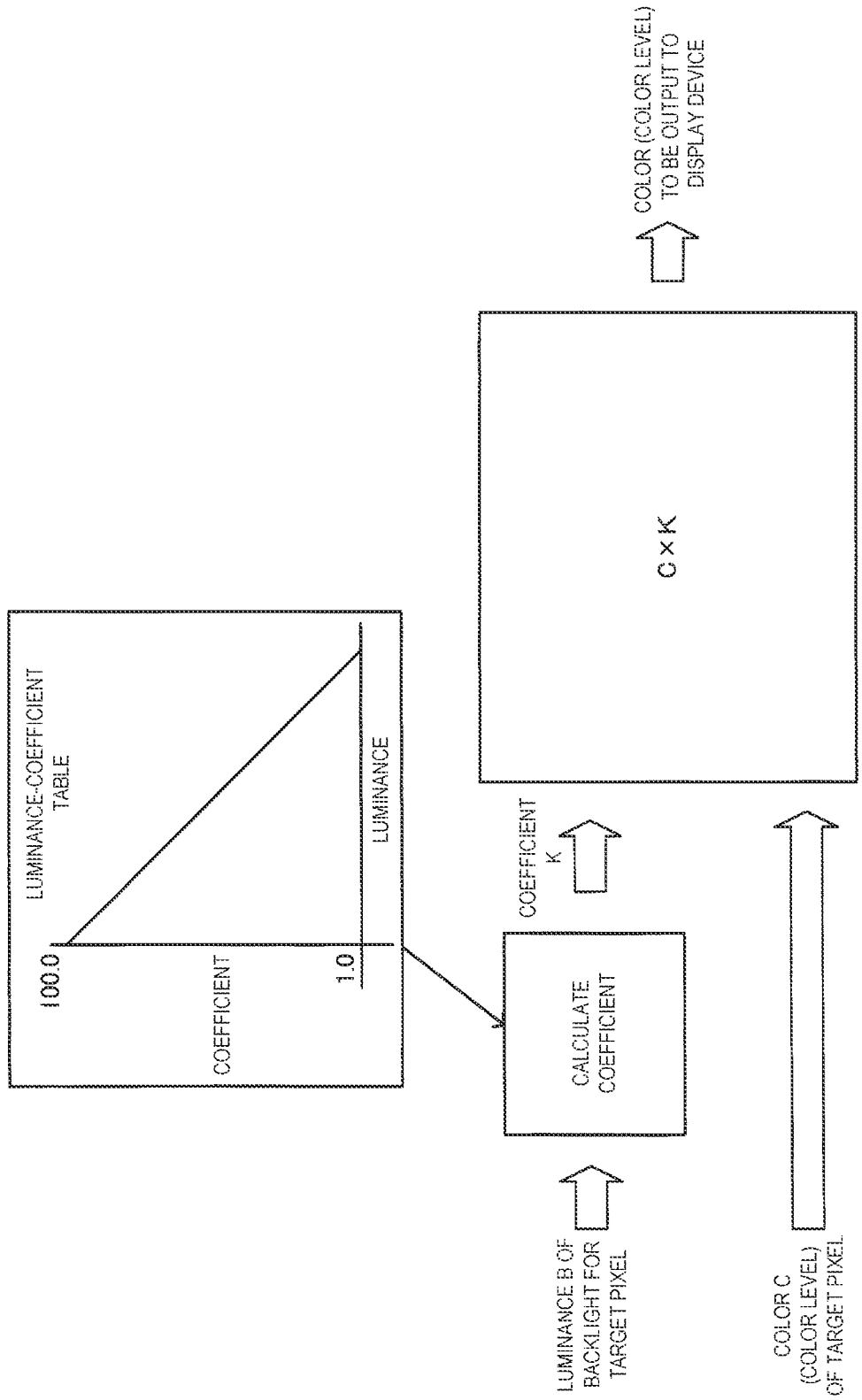
FIG. 7 is a diagram illustrating color correction.

FIG. 7 is a diagram illustrating a processing example of the color correction. First, as described with reference to FIG. 6, a luminance B of the backlight 120 for a target pixel is obtained. A luminance-coefficient table is stored in a storage circuit (not shown) of the circuit device 10, and a coefficient K is calculated based on the luminance B of the backlight 120 using the table. The luminance-coefficient table in FIG. 7 is a table in which the coefficient K increases as the luminance B decreases. Instead of using such a luminance-coefficient table, the coefficient K may be obtained from the luminance B based on a predetermined calculation formula. Although the luminance-coefficient table in FIG. 7 has primary characteristics, the present disclosure is not limited thereto, and appropriate characteristics according to characteristics of human eyes with respect to the brightness of light may be used. In addition, the coefficient K may be obtained by interpolating two output values of the luminance-coefficient table by primary interpolation, spline interpolation, or the like. Then, the coefficient K thus obtained is multiplied by a level of a color C of the target pixel to obtain a color level to be output to the display device 100. That is, processing of increasing the color level of the image data is performed on a pixel having the low luminance B of the backlight 120. In this manner, the color correction circuit 30 can obtain the display image data IMD from the image data IM and output the display image data IMD to the display device 100. In the luminance-coefficient table in FIG. 7, the coefficient K increases as the luminance B of the backlight 120 decreases. Therefore, as the luminance of the backlight 120 for the target pixel decreases, the color level of the target pixel increases, which enables the dimming control.

As described above, in the embodiment, as shown in FIG. 3, the display device 100 includes the display panel 110 and the backlight 120. The circuit device 10 includes the distortion correction circuit 20, the dimming control circuit 50, and the light source control circuit 60. Further, the distortion correction circuit 20 performs the distortion correction on the image data IMI. That is, the distortion correction of the image data IMI of the video including the specific still image from the processing device 200 is performed, and the image data IM after the distortion correction is output. By providing such a distortion correction circuit 20, it is possible to perform, on the image, the distortion correction which is the image distortion inverse to the image distortion caused by the curved surface or the like of the screen on which the display image of the display panel 110 is projected. Accordingly, the user sees the image without distortion. Then, the dimming control circuit 50 analyzes the image data IM after the distortion correction, and calculates dimming information for local dimming control of the backlight 120. For example, as described with reference to FIGS. 3 to 5, the backlight 120 includes the plurality of light sources LS, and each light source of the plurality of light sources LS is provided corresponding to each area of the plurality of areas AR of the display panel 110. Then, the dimming control circuit 50 performs the luminance analysis on the image data IM in each area, and calculates, based on a result of the luminance analysis in each area, the dimming amount of each light source corresponding to each area as the dimming information. Further, the light source control circuit 60 performs light source control on the backlight 120 based on the calculated dimming information. That is, the light source control for causing each light source of the plurality of light sources LS corresponding to each area of the plurality of areas AR to emit light based on the calculated dimming information is performed. For example, the light source control circuit 60 outputs luminance information in each area of the backlight 120, which is the dimming information, as light source control information CLS. The light source control information CLS corresponds to the light source control signal. The light source driver 130 drives each light source of the plurality of light sources LS of the backlight 120 based on the light source control information CLS.

The color correction circuit 30 performs, based on the image data IM after the distortion correction and the dimming information, the color correction on the image data IM after the distortion correction. For example, the color correction circuit 30 performs the color correction according to the dimming control on the backlight 120 based on the information on the dimming amount which is the dimming information from the dimming control circuit 50. For example, when the dimming control for decreasing the light amount of the light source is performed in the area corresponding to the light source, the color correction circuit 30 performs the color correction to increase the luminance of the pixels in the area by an amount corresponding to the decrease in the light amount of the light source in the area, and outputs the display image data IMD after the color correction to the display device 100. Accordingly, the light amount of the light source in the area can be decreased, and the image corresponding to the original image data IM can be displayed in the area based on the display image data IMD obtained by the color correction, so that the local dimming can be implemented. As a result, it is possible to reduce the power consumption of the backlight 120 and to display an image in which black pixels appear blacker.

Then, as shown in FIG. 3, the error check circuit 40 calculates the error detection code value of the display image data IMD after the color correction, and compares the error detection code value with the expected value EV. For example, the error check circuit 40 compares the error detection code value of the display image data IMD after the color correction with the expected value EV received from the processing device 200. The display image data IMD in which the error detection code value is calculated is the image data of the specific still image whose frame is designated by the processing device 200. When the error detection code value does not coincide with the expected value EV, the error check circuit 40 determines that an error occurs, and outputs, for example, the interrupt signal to the processing device 200 or the like. In this way, an error check of comparing the error detection code value with the expected value EV is performed on the display image data IMD after the distortion correction is performed and the color correction is performed based on the dimming information. Therefore, by comparing the error detection code value with the expected value EV, it is possible to check whether the distortion correction, the calculation processing of the dimming amount, the color correction, and the like are appropriately performed. Accordingly, an error check as to whether the distortion correction circuit 20, the color correction circuit 30, the dimming control circuit 50, and the like are appropriately operating can be implemented by simple processing of comparing the error detection code value with the expected value EV. For example, as a method in a comparative example according to the embodiment, a method of checking an error by performing inverse distortion correction or inverse color correction and comparing the resulted image data with the original image data may be considered. However, the method requires a circuit having an inverse conversion function such as an inverse distortion correction circuit or an inverse color correction circuit, which causes an increase in a circuit scale and processing load. On the other hand, in the embodiment, by simple processing of calculating the error detection code value of the display image data IMD on which the distortion correction is performed by the distortion correction circuit 20 and the color correction is performed by the color correction circuit 30 based on the dimming information from the dimming control circuit 50, and comparing the error detection code value with the expected value EV, the output error check of checking whether appropriate display image data IMD is output can be implemented. Therefore, it is possible to check whether the distortion correction circuit 20, the color correction circuit 30, the dimming control circuit 50, and the like are appropriately operating while preventing an increase in the circuit scale, an increase in the processing load, and the like.

In the embodiment, the circuit device 10 includes the light source control circuit 60 that performs the light source control on the backlight 120. The processing device 200 outputs the expected value EV of the error detection code of the light source control information CLS output from the light source control circuit 60. The light source control information CLS corresponds to, for example, the light source control signal, and is information for setting or designating, for example, luminance of the light sources LS of the backlight 120 at which the light sources LS emit light. Then, as shown in FIG. 3, the error check circuit 40 compares the error detection code value of the light source control information CLS with the expected value EV. The light source control information CLS in which the error detection code value is calculated is light source control information when the specific still image whose frame is designated by the processing device 200 is displayed. When the error detection code value does not coincide with the expected value EV, the error check circuit 40 determines that an error occurs, and outputs, for example, the interrupt signal to the processing device 200 or the like.

In this way, it is possible to check, by simple processing of comparing the error detection code value with the expected value EV, whether appropriate light source control information CLS is output from the light source control circuit 60. Therefore, by comparing the error detection code value with the expected value EV, it is possible to check whether the light source control, the dimming control, and the like are appropriately performed. For example, when the specific still image as shown in FIG. 2 is displayed, it is possible to check whether each light source of the backlight 120 is controlled to emit light with an appropriate dimming amount corresponding to the specific still image. Accordingly, the output error check as to whether appropriate light source control information CLS is output by appropriately operating the light source control circuit 60 that performs the light source control, the dimming control circuit 50 that performs the dimming control for the light source control, and the like can be implemented by simple processing of comparing the error detection code value with the expected value EV.

Figure 8:
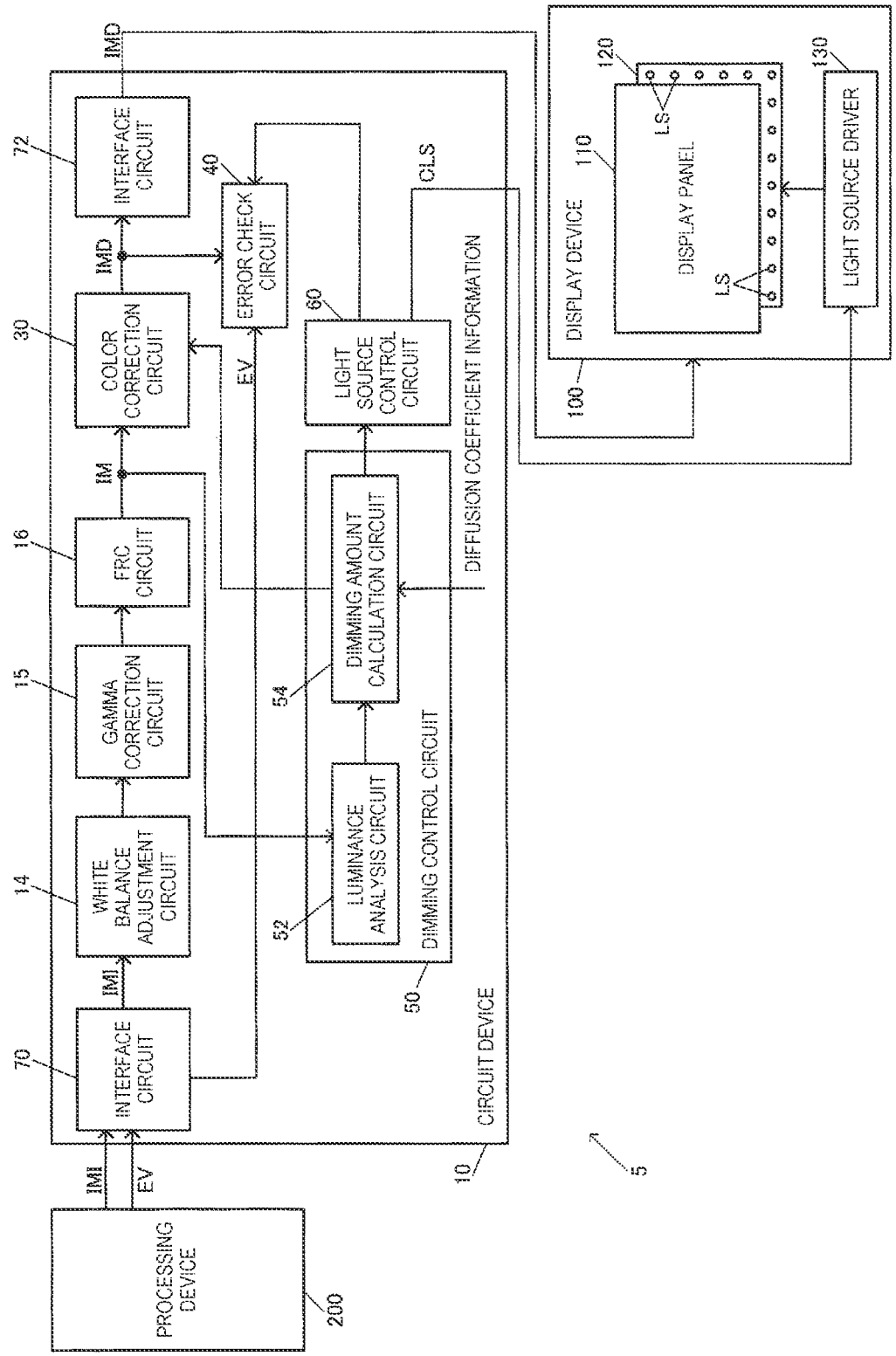
FIG. 8 shows another detailed configuration example of the circuit device according to the embodiment.

FIG. 8 shows another detailed configuration example of the display control system 5 and the circuit device 10 according to the embodiment. The configuration example in FIG. 3 is a configuration example when the display control system 5 is used for the head-up display or the like. On the other hand, FIG. 8 is a configuration example when the display control system 5 is used for, for example, a center information display or a meter cluster display. For example, although the distortion correction circuit 20 shown in FIG. 3 is not provided in FIG. 8, a white balance adjustment circuit 14, a gamma correction circuit 15, and a FRC circuit 16 are provided. The white balance adjustment circuit 14, the gamma correction circuit 15, the FRC circuit 16, and the color correction circuit 30 in FIG. 8 correspond to, for example, the image processing circuit 12 in FIG. 1. White balance adjustment is processing of adjusting a color temperature or the like such that a white display object is appropriately displayed in white. Gamma correction is processing of correcting brightness and saturation of an image such that an image displayed on the display device 100 is close to a natural color. FRC is processing of performing high-definition gradation display by frame rate control.

In FIG. 8, for example, the color correction circuit 30 performs the color correction based on the dimming information on the image data IM after the processing such as the white balance adjustment, the gamma correction, and the FRC is performed. Then, the error check circuit 40 compares the error detection code value of the display image data IMD after the white balance adjustment, the gamma correction, the FRC, and the color correction are performed with the expected value EV, and performs the error check on the specific still image.

In this way, by comparing the error detection code value with the expected value EV, it is possible to check whether the white balance adjustment, the gamma correction, the FRC, the color correction, and the like are appropriately performed. Therefore, the output error check as to whether appropriate display image data IMD is output by appropriately operating the white balance adjustment circuit 14, the gamma correction circuit 15, the FRC circuit 16, the color correction circuit 30, and the like can be implemented by simple processing of comparing the error detection code value with the expected value EV.

3. Processing Example

Figure 9:
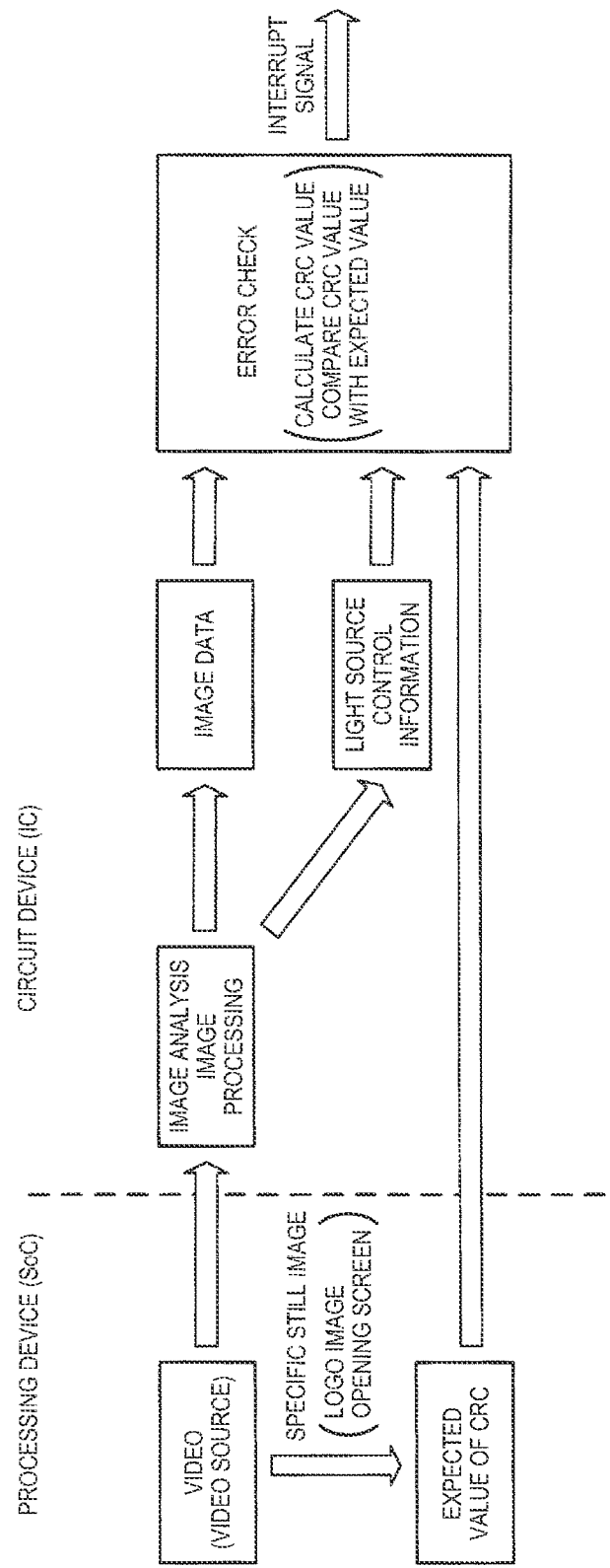
FIG. 9 is a diagram illustrating a processing example according to the embodiment.

Next, a processing example according to the embodiment will be described in detail. FIG. 9 is a diagram illustrating the processing example according to the embodiment. As shown in FIG. 9, a video as a video source includes a specific still image such as a logo image and an opening image. The processing device 200 outputs an expected value of the CRC of the specific still image to the circuit device 10. The circuit device 10 performs image analysis and image processing on the image data of the video from the processing device 200. The image analysis is, for example, image analysis for the dimming control. The image processing is, for example, the color correction, the distortion correction, the white balance adjustment, or the gamma correction. Then, the circuit device 10 performs the error check on the image data after the image processing and on the light source control information obtained based on the image analysis. That is, the circuit device 10 calculates the CRC values of the image data corresponding to the specific still image and the light source control information when the specific still image is displayed, and compares the CRC values with the expected values of the CRC received from the processing device 200.

When the CRC value does not coincide with the expected value, the circuit device 10 outputs the interrupt signal to the processing device 200 or the like. Accordingly, the processing device 200 or the like can appropriately check whether an error occurs in the image processing in the circuit device 10, the dimming control that is based on the image analysis, or the like.

Figure 10:
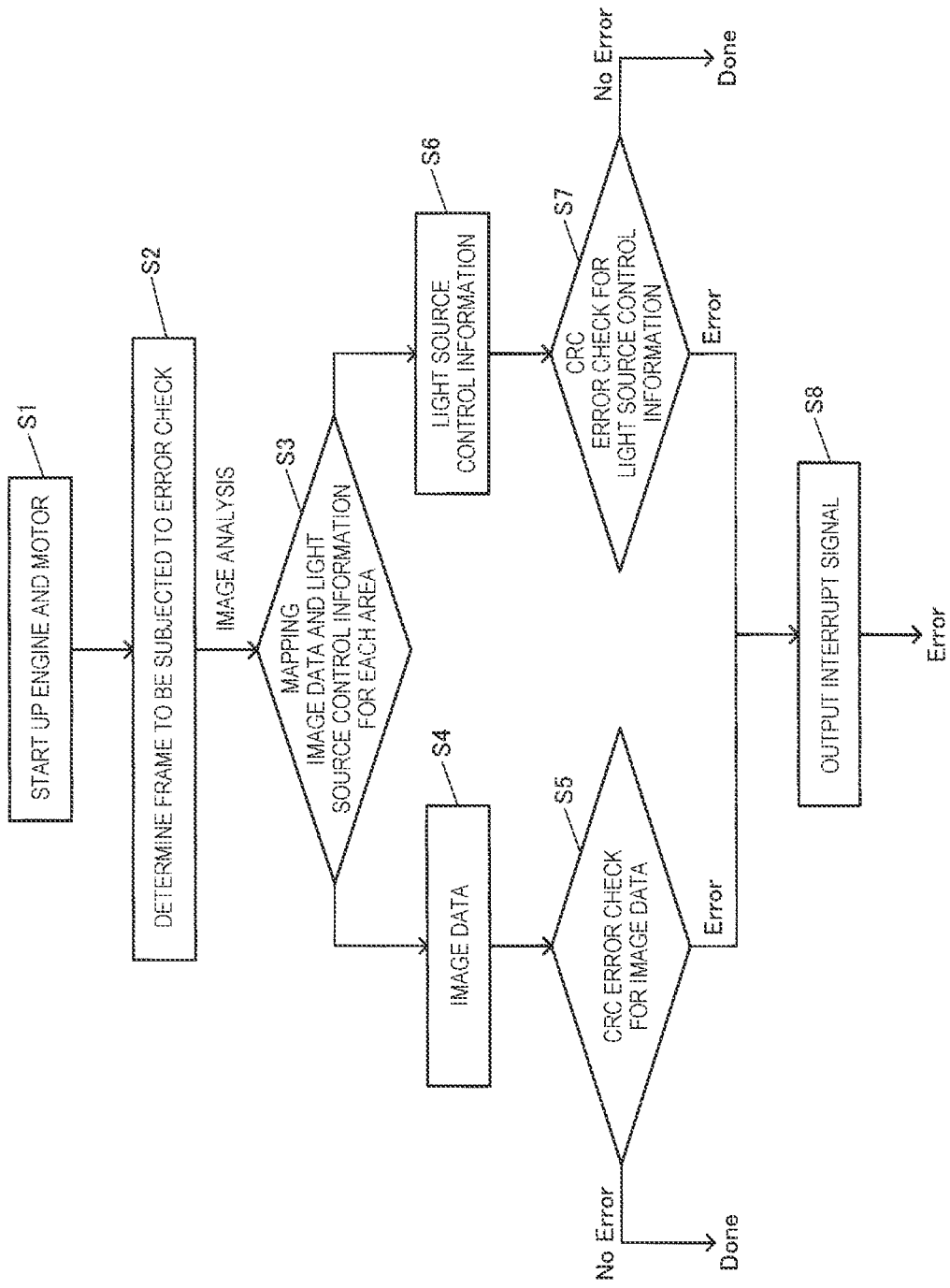
FIG. 10 is a flowchart showing the processing example according to the embodiment.

FIG. 10 is a flowchart showing the processing example according to the embodiment. First, an engine and a motor of a moving object such as an automobile are started up (step S1), and a frame to be subjected to the error check is determined (step S2). When the engine and the motor are started up, reproduction of the video in which an image such as a logo or an emblem is displayed is started. Then, on the processing device 200 side, a frame in which the specific still image such as the logo or the emblem is displayed in the video is determined, and the processing device 200 transmits, for example, information for designating the frame to the circuit device 10. Then, processing of mapping the image data and the light source control information for each area of the plurality of areas is performed (step S3). For example, the dimming control for the local dimming and the color correction based on the dimming information are performed. At this time, when image enhancement processing such as the distortion correction, the white balance, the gamma correction, or the FRC is performed, an expected value in anticipation of the image enhancement is prepared, and the processing device 200 transmits the expected value to the circuit device 10. Then, for the image data of the specific still image, the error check is performed to compare the CRC value with the expected value (steps S4 and S5). When the CRC value does not coincide with the expected value, the interrupt signal is output (step S8). Further, for the light source control information corresponding to the light source control signal when the specific still image is displayed, the error check is performed to compare the CRC value with the expected value (steps S6 and S7). When the CRC value does not coincide with the expected value, the interrupt signal is output (step S8).

Figures 11, 12:
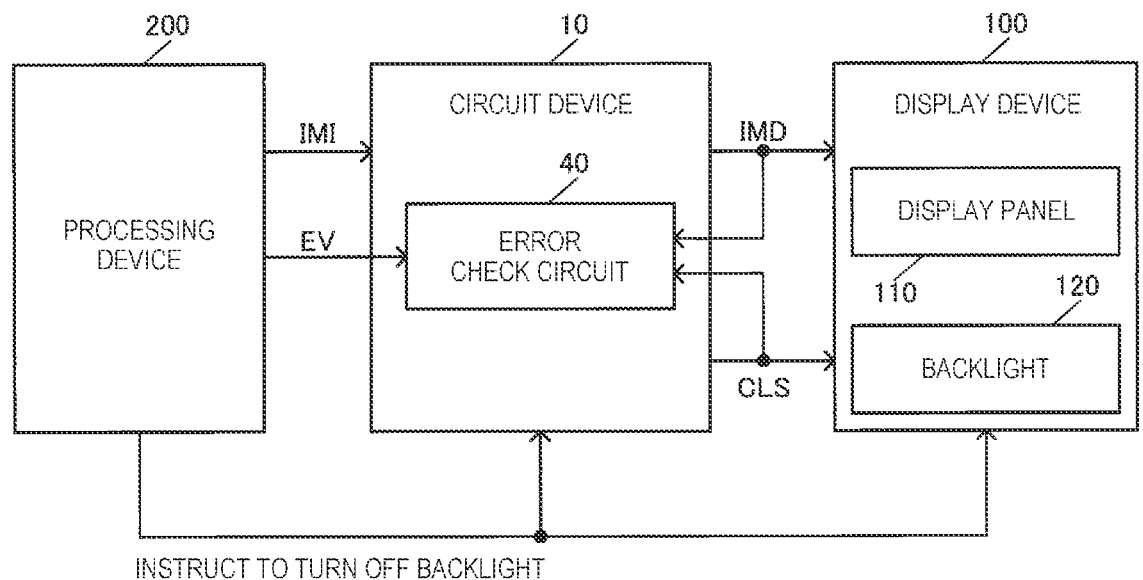
FIG. 11 is a diagram illustrating a method of performing an error check even when the backlight is turned off.
FIG. 12 is a diagram illustrating error check methods corresponding to a plurality of operation environments.

In the embodiment, the circuit device 10 includes the light source control circuit 60 that performs the light source control on the backlight 120. The error check circuit 40 performs the processing of comparing the error detection code value with the expected value even when the processing device 200 issues an instruction to turn off the backlight 120. For example, in the in-vehicle display device 100 or the like, the user may set an option setting to hide the video in which the logo or the emblem is displayed. When such a setting is made, in the embodiment, the processing device 200 instructs to turn off the backlight 120 as shown in FIG. 11. The instruction to turn off the backlight 120 may be issued directly to the display device 100 by the processing device 200, or may be issued, through the circuit device 10 which is a display controller, to instruct the display device 100 to turn off the backlight 120. When the backlight 120 is turned off, even if an image based on the display image data IMD is displayed on the display panel 110, the image cannot be seen by the user. Accordingly, it is possible to set to hide the video in which the logo or the emblem is displayed.

Further, even when the instruction to turn off the backlight 120 is issued as described above, the error check circuit 40 performs the processing of comparing the error detection code value with the expected value. For example, the error detection code value of the display image data IMD and the expected value are compared with each other, and the error detection code value of the light source control information CLS and the expected value are compared with each other to check whether there is an error. That is, the error check is executed in a background while hiding the video such as the logo or the emblem. In this way, it is possible to implement the error check by comparing the error detection code value of the specific still image with the expected value while complying with the setting by the user to hide the video including the specific still image. Therefore, it is possible to achieve both improvement in user convenience and improvement in reliability.

In the embodiment, the processing device 200 stores a first expected value to an n-th expected value respectively corresponding to a first operation environment to an n-th operation environment. For example, the first expected value to the n-th expected value are stored in the storage unit of the processing device 200 (not shown). Here, n is an integer of 2 or more. The error check circuit 40 performs processing of comparing an i-th error detection code value with an i-th expected value when the operation environment is an i-th operation environment among the first operation environment to the n-th operation environment. For example, the error check circuit 40 performs the error check processing of comparing the i-th error detection code value with the i-th expected value, and determining that an error is detected when the i-th error detection code value does not coincide with the i-th expected value. Here, i is an integer of $1 \leq i \leq n$. In this case, for example, the processing device 200 may output, to the circuit device 10, the first expected value to the n-th expected value corresponding to the first operation environment to the n-th operation environment, and the error check circuit 40 may compare the i-th error detection code value of the corresponding specific still image with the i-th expected value among the first expected value to the n-th expected value. Alternatively, the processing device 200 may output, to the circuit device 10, the i-th expected value among the first expected value to the n-th expected value, and the error check circuit 40 may compare the i-th error detection code value of the specific still image corresponding to the i-th expected value with the i-th expected value.

For example, in FIG. 12, expected values EV1 to EVn which are the first expected value to the n-th expected value of the CRC corresponding to operation environments OPE1 to OPEn, which are the first operation environment to the n-th operation environment, are prepared. Then, for example, when the operation environment of the display control system 5 or the processing device 200 is an operation environment OPE1 which is the i-th operation environment, the error check is performed by comparing an expected value EV1 which is the i-th expected value with the CRC value.

In this way, when the display control system 5 operates in a plurality of operation environments, it is possible to implement error detection by the error check by comparing an appropriate error detection code value corresponding to each operation environment with a corresponding expected value. Accordingly, it is possible to secure reliability of the display control system 5 and the circuit device 10 in various operation environments.

For example, in the embodiment, the first operation environment to the n-th operation environment are brightness environments. For example, the operation environments of the first operation environment to the n-th operation environment are operation environments with different brightness. For example, in the display control system 5, global dimming control of the backlight 120 may be performed based on detection information from an external light sensor or the like. For example, the global dimming control is performed such that light from the light sources LS of the backlight 120 is brightened when the external light is bright, and light from the light sources LS of the backlight 120 is darkened when the external light is dark. When such global dimming control is performed, the color correction of the image data is performed based on the dimming information of the global dimming. For example, due to the color of the light sources of the backlight 120 or the like, a color tone of the display image also changes according to a change in the luminance of the backlight 120. Therefore, the color correction is performed for preventing the change in the color tone of the display image according to the change in the luminance of the backlight 120. The global dimming control and the color correction may be performed by the processing device 200, may be performed by the circuit device 10, or may be performed by processing in which the processing device 200 and the circuit device cooperate with each other.

When the brightness environment, which is the operation environment, changes as described above, for example, the color correction or the like is also performed on the image data due to the global dimming control or the like, and the content of the image data may also change. Therefore, even if the error detection is performed with only one expected value corresponding to one environment prepared, such a change in the brightness environment may not be able to be handled.

Therefore, in the embodiment, the first expected value to the n-th expected value corresponding to the first brightness environment to the n-th brightness environment are prepared. For example, when the control is performed with 4-bit dimming information, 16 levels of brightness are set, and therefore, 16 expected values corresponding to the 16 levels of brightness are prepared. When the brightness environment is an i-th brightness environment, the error check circuit 40 implements the error detection by comparing the i-th error detection code value corresponding to the i-th brightness environment with the i-th expected value. In this case, when at least one expected value of the plurality of expected values for the brightness environment coincides with the error detection code value, it may be determined that the error is not detected.

In this way, when the display control system 5 operates in a plurality of brightness environments, it is possible to implement the error detection by the error check by comparing an appropriate error detection code value corresponding to each brightness environment with a corresponding expected value. Accordingly, it is possible to secure reliability of the display control system 5 and the circuit device 10 in various brightness environments.

Alternatively, the first operation environment to the n-th operation environment may be operation mode environments of the circuit device 10. An operation mode is, for example, a FRC operation mode of the circuit device 10. For example, it is assumed that FRC gradation display of every four frames is performed based on control data of two bits which are lower bits. In this case, for example, four frames of image data having different gradation characteristics are prepared, and the FRC gradation display is performed by displaying the image data designated by the control data of two bits from among the four frames of image data. In this case, for example, expected values of four error detection codes corresponding to the four frames of image data are prepared. For example, when the i-th image data of the four frames of image data is displayed, the error detection is implemented by comparing the i-th error detection code value corresponding to the i-th image data with the i-th expected value. In this case, when at least one expected value of the plurality of expected values for the operation mode environment coincides with the error detection code value, it may be determined that the error is not detected.

In this way, when the circuit device 10 operates in a plurality of operation mode environments, it is possible to implement the error detection by the error check by comparing an appropriate error detection code value corresponding to each operation mode environment with a corresponding expected value. Accordingly, it is possible to secure reliability of the circuit device 10 and the display control system 5 in various operation mode environments. The operation mode environment is not limited to the operation mode environment of the FRC. For example, when the circuit device 10 performs different image processing according to the operation mode, the expected value corresponding to each image processing is prepared. Further, when the circuit device 10 performs i-th image processing as an i-th operation mode, the error detection can be implemented by comparing the i-th error detection code value corresponding to the i-th image processing with the i-th expected value.

4. Display System and Moving Object

FIG. 13 shows a configuration example of a head-up display 190 as an example of the display system according to the embodiment. The head-up display 190, which is the display system according to the embodiment, includes the display control system 5 and the display device 100 according to the embodiment. The display control system 5 may not include the processing device 200. The display device 100 displays the display image based on the display image data IMD from the circuit device 10. When the display system is the head-up display 190, the display device 100 displays a virtual image to the user by projecting the display image. For example, the display device 100 includes the display panel 110 and the backlight 120. The display device 100 may include a display driver 140 that drives the display panel 110, and the diffusion plate 115 provided between the display panel 110 and the backlight 120. The display device 100 may include a projection optical system such as a mirror 150 that reflects projection light of a projection image.

The display driver 140 drives the data lines and the scanning lines of the display panel 110 to display the image based on the display image data IMD from the circuit device 10. Light emitted from the backlight 120 passes through the diffusion plate 115 and the display panel 110, and is reflected by the mirror 150 toward a direction of a transparent screen 160. The transparent screen 160 is, for example, a windscreen of an automobile. A reflective surface of the transparent screen 160 is, for example, a concave surface, and the projection image is a virtual image when viewed from the user. That is, when viewed from the user, the projection image appears to be formed farther than the transparent screen 160. Accordingly, the projection image can be displayed in the background.

The display system according to the embodiment is not limited to the configuration shown in FIG. 13, and various modifications can be made. For example, a display panel other than the liquid crystal display panel may be used as the display panel 110, and various modifications of the arrangement of the diffusion plate 115 and the projection optical system can be made. In addition, the display system according to the embodiment is not limited to the head-up display 190 as shown in FIG. 13, and may be another display system for an automobile such as a cluster display or a center information display, or may be a display system for an application other than the automobile.

Figure 14:
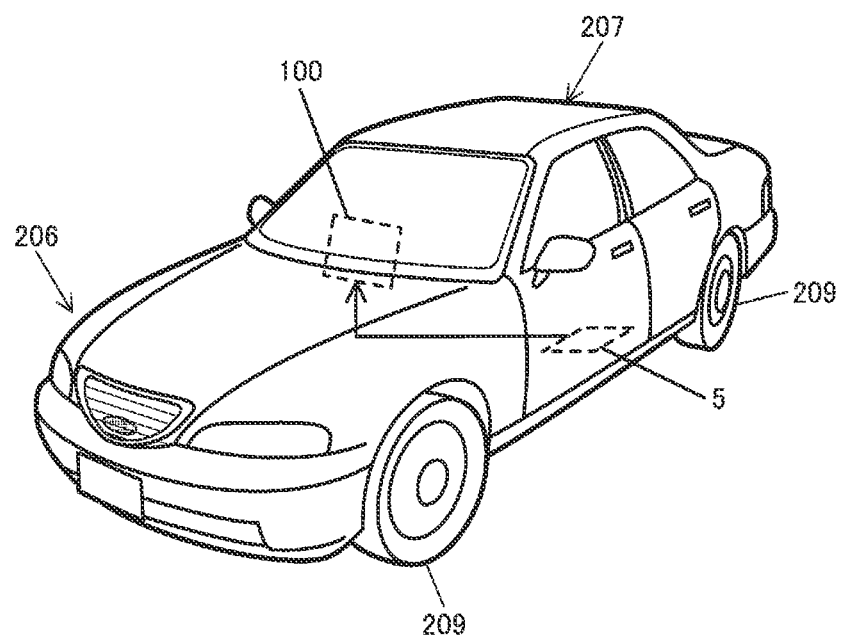
FIG. 14 is an example of a moving object including the display control system according to the embodiment.

FIG. 14 is a diagram showing an example of a moving object according to the embodiment. The moving object includes the display control system 5 according to the embodiment and the display device 100 whose display is controlled by the display control system 5. The moving object may include a drive mechanism such as an engine or a motor, and a control device such as an electronic control unit (ECU) that controls the drive mechanism. The drive mechanism can also be referred to as a power source of the moving object. The moving object is, for example, an automobile, a motorcycle, a bicycle, a ship, or an airplane. The moving object is equipment or a device that moves on the ground, in the sky, and on the sea, which includes, for example, a drive mechanism such as an engine or a motor, a steering mechanism such as a steering wheel or a rudder, and various kinds of electronic equipment. FIG. 14 schematically shows an automobile 206 as a specific example of the moving object. For example, the control device of the moving object controls, for example, hardness of a suspension according to a posture of a vehicle body 207, or controls brakes of individual wheels 209. The display device 100 is used as, for example, the HUD, the CID, or the cluster display of the automobile 206.

As described above, the display control system according to the embodiment includes a processing device and a circuit device configured to perform display control on a display device under control of the processing device. The processing device outputs an expected value of an error detection code of a specific still image in a predetermined frame of a video displayed on the display device. The circuit device includes an error check circuit that receives image data of the video from the processing device, calculates an error detection code value of the specific still image in the predetermined frame, and checks an error by comparing the error detection code value with the expected value.

According to the embodiment, the processing device outputs the expected value of the error detection code of the specific still image in the predetermined frame of the video displayed on the display device, and the circuit device receives the image data of the video, calculates the error detection code value of the specific still image in the predetermined frame, and checks the error by comparing the error detection code value with the expected value. In this way, by effectively using the specific still image included in the video, and outputting, by the processing device, the expected value of the error detection code of the specific still image to the circuit device, the circuit device can check the error by simple processing of comparing the error detection code value of the specific still image with the expected value. Therefore, it is possible to provide a display control system and the like capable of implementing the error check with simple processing effectively using the specific still image.

In the embodiment, the specific still image may be an image in the predetermined frame of the video to be displayed at start-up of a moving object provided with the display control system.

In this way, it is possible to detect an error by simple processing of effectively utilizing the specific still image to be displayed at the start-up of the moving object and comparing the error detection code value of the specific still image with the expected value.

In the embodiment, the specific still image may be an image including a specific character, a specific symbol, or a specific mark.

In this way, it is possible to check an error by effectively utilizing the specific still image including the specific character, the specific symbol, or the specific mark and comparing the error detection code value with the expected value.

In the embodiment, the display device may include a display panel and a backlight, and the circuit device may include a light source control circuit that performs light source control on the backlight. The processing device may output the expected value of the error detection code of light source control information output from the light source control circuit, and the error check circuit may compare the error detection code value of the light source control information with the expected value.

In this way, it is possible to check whether appropriate light source control information is output from the light source control circuit by simple processing of comparing the error detection code value with the expected value.

In the embodiment, the display device may include a display panel and a backlight, and the circuit device may include a distortion correction circuit that performs distortion correction on the image data, and a dimming control circuit that analyzes the image data after the distortion correction and calculates dimming information for local dimming control of the backlight. The circuit device may further include a light source control circuit that performs light source control on the backlight based on the dimming information, and a color correction circuit that performs color correction on the image data after the distortion correction based on the image data after the distortion correction and the dimming information. The error check circuit may calculate the error detection code value of the image data after the color correction and compare the error detection code value with the expected value.

In this way, the error check of comparing the error detection code value with the expected value is performed on the display image data obtained after the distortion correction is performed and the color correction is performed based on the dimming information, and it is possible to check whether the distortion correction, the calculation processing of a dimming amount, the color correction, and the like are appropriately performed.

In the embodiment, the display device may include a display panel and a backlight, and the circuit device may include a light source control circuit that performs light source control on the backlight. The error check circuit may compare the error detection code value with the expected value even when the processing device issues an instruction to turn off the backlight.

In this way, it is possible to implement the error check by comparing the error detection code value with the expected value while complying with the setting to hide the video including the specific still image.

In the embodiment, the processing device may store a first expected value to an n-th expected value respectively corresponding to a first operation environment to an n-th operation environment, n being an integer of 2 or more. The error check circuit may compare an i-th error detection code value with an i-th expected value when an operation environment is an i-th operation environment among the first operation environment to the n-th operation environment, i being an integer of $1 \le i \le n$.

In this way, when the display control system operates in a plurality of operation environments, it is possible to implement the error detection by the error check by comparing an appropriate error detection code value corresponding to each operation environment with a corresponding expected value.

In the embodiment, the first operation environment to the n-th operation environment may be brightness environments.

In this way, when the display control system operates in a plurality of brightness environments, it is possible to implement the error detection by the error check by comparing an appropriate error detection code value corresponding to each brightness environment with a corresponding expected value.

In the embodiment, the first operation environment to the n-th operation environment may be operation mode environments of the circuit device.

In this way, when the circuit device operates in a plurality of operation mode environments, it is possible to implement the error detection by the error check by comparing an appropriate error detection code value corresponding to each operation mode environment with a corresponding expected value.

The moving object according to the embodiment may include the display control system described above and the display device.

Although the embodiment has been described in detail as described above, it can be readily apparent to those skilled in the art that many modifications may be made without departing substantially from novel matters and effects of the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. Further, all combinations of the embodiment and the modifications are also included in the scope of the present disclosure. Further, configurations, operations, and the like of the display control system, the circuit device, the display device, the display system, the head-up display, and the like are not limited to those described in the embodiment, and various modifications can be made.

What is claimed is:

1. A display control system comprising:
   a processing device; and
   a circuit device configured to perform display control on a display device under control of the processing device, wherein
   the processing device outputs image data of a video and a known expected value of an error detection code of a specific known still image in a predetermined known frame of the video displayed on the display device,
   the circuit device includes:
      an image processing circuit configured to receive the image data of the video and perform image processing on the image data of the video to generate processed image data; and
      an error check circuit configured to receive the processed image data of the video from the image processing circuit, calculate an error detection code value of a processed specific still image in a processed predetermined frame of the processed image data of the video, and check an error by comparing the error detection code value with the known expected value, and
   the processed specific still image corresponds to the specific known still image, and the processed predetermined frame corresponds to the predetermined known frame.

2. The display control system according to claim 1, wherein
   the specific known still image is an image in the predetermined known frame of the video to be displayed at start-up of a moving object provided with the display control system.

3. The display control system according to claim 1, wherein
   the specific known still image is an image including a specific character, a specific symbol, or a specific mark.

4. The display control system according to claim 1, wherein
   the display device includes a display panel and a backlight,
   the circuit device includes a light source control circuit that performs light source control on the backlight,
   the processing device outputs the known expected value of the error detection code of light source control information output from the light source control circuit, and
   the error check circuit compares the error detection code value of the light source control information with the known expected value.

5. The display control system according to claim 1, wherein
   the display device includes a display panel and a backlight,
   the circuit device includes:
      a dimming control circuit configured to analyze the processed image data and calculate dimming information for local dimming control of the backlight;
      a light source control circuit configured to perform light source control on the backlight based on the dimming information; and
      a color correction circuit configured to perform color correction on the processed image data based on the dimming information, and
   the error check circuit calculates the error detection code value of the processed image data after the color correction and compares the error detection code value with the known expected value.

6. The display control system according to claim 1, wherein
   the display device includes a display panel and a backlight,
   the circuit device includes a light source control circuit that performs light source control on the backlight, and
   the error check circuit compares the error detection code value with the known expected value even when the processing device issues an instruction to turn off the backlight.

7. The display control system according to claim 1, wherein
   the processing device stores a first known expected value, as the known expected value, to an n-th known expected value, as the known expected value, respectively corresponding to a first operation environment to an n-th operation environment, n being an integer of 2 or more, and
   the error check circuit compares an i-th error detection code value, as the error detection code value, with an i-th known expected value, as the known expected value, when an operation environment is an i-th operation environment among the first operation environment to the n-th operation environment, i being an integer of $1 \leq i \leq n$.

8. The display control system according to claim 7, wherein
the first operation environment to the n-th operation environment are brightness environments.

9. The display control system according to claim 7, wherein
the first operation environment to the n-th operation environment are operation mode environments of the circuit device.

10. A moving object comprising:
the display control system according to claim 1; and
the display device.

11. The display control system according to claim 1, wherein
the processing device outputs frame designation information to the circuit device, and
the predetermined known frame is designated by the frame designation information.

12. A display control system comprising:
a processing device; and
a circuit device configured to perform display control on a display device under control of the processing device, wherein
the processing device outputs image data of a video and a known expected value of an error detection code of a specific known still image in a predetermined known frame of the video displayed on the display device,
the circuit device includes:
an image processing circuit configured to receive the image data of the video and perform image processing on the received image data to generate processed image data; and
an error check circuit configured to receive the processed image data of the video from the image processing circuit, calculate an error detection code value of a processed specific still image in a processed predetermined frame of the processed image data of the video, and check an error by comparing the error detection code value with the known expected value,
the image processing is either a color correction, a gamma correction, or a white balance adjustment of the received image data of the video, and
the processed specific still image corresponds to the specific known still image, and the processed predetermined frame corresponds to the predetermined known frame.

13. The display control system according to claim 1, wherein
the image processing includes a gamma correction and a white balance adjustment of the image data of the video.

14. The display control system according to claim 2, wherein
the image processing includes a gamma correction and a white balance adjustment of the image data of the video.

15. The display control system according to claim 12, wherein
the specific known still image is an image in the predetermined known frame of the video to be displayed at start-up of a moving object provided with the display control system.

16. The display control system according to claim 12, wherein
the specific known still image is an image including a specific character, a specific symbol, or a specific mark.

17. The display control system according to claim 12, wherein
the display device includes a display panel and a backlight,
the circuit device includes a light source control circuit that performs light source control on the backlight,
the processing device outputs the known expected value of the error detection code of light source control information output from the light source control circuit, and
the error check circuit compares the error detection code value of the light source control information with the known expected value.

18. The display control system according to claim 12, wherein
the display device includes a display panel and a backlight,
the circuit device includes a light source control circuit that performs light source control on the backlight, and
the error check circuit compares the error detection code value with the known expected value even when the processing device issues an instruction to turn off the backlight.

19. The display control system according to claim 12, wherein
the processing device outputs frame designation information to the circuit device, and
the predetermined known frame is designated by the frame designation information.

20. A moving object comprising:
the display control system according to claim 12; and
the display device.

* * * * *